(12) United States Patent
Kurmaniak (10) Patent No.: US 6,935,476 B2
(45) Date of Patent: Aug. 30, 2005

(54) CLUTCH HAVING A MULTIPLE POLE ELECTROMAGNETIC ACTUATOR FOR TRANSFER CASES AND THE LIKE

(75) Inventor: Christopher V. Kurmaniak, Clarkston, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 25 days.

(21) Appl. No.: 10/769,951

(22) Filed: Feb. 2, 2004

(65) Prior Publication Data

US 2005/0167231 A1    Aug. 4, 2005

(51) Int. Cl.$^7$ .......................... F16D 43/00; H02K 37/00
(52) U.S. Cl. .......................... 192/35; 192/40; 192/84.7; 310/37; 310/49 R
(58) Field of Search .......................... 192/35, 40, 70.23, 192/84.6, 84.7; 310/27, 37, 36, 46, 47 R, 310/116; 335/267, 266, 272; 180/233, 249, 180/248, 247

(56) References Cited

U.S. PATENT DOCUMENTS

| | | | |
|---|---|---|---|
| 1,873,171 A * | 8/1932 | Zetsche et al. ............... 310/46 |
| 3,054,011 A * | 9/1962 | Silverschotz et al. ....... 310/268 |
| 3,821,673 A * | 6/1974 | Daugherty et al. ......... 335/267 |
| 4,101,858 A | 7/1978 | Henninger | |
| 4,985,652 A | 1/1991 | Oudet et al. | |
| 5,214,337 A | 5/1993 | Ishibashi | |
| 5,298,825 A | 3/1994 | Oudet et al. | |
| 5,407,024 A * | 4/1995 | Watson et al. .............. 180/248 |
| 5,444,313 A | 8/1995 | Oudet | |
| 5,492,194 A * | 2/1996 | McGinn et al. ............. 180/233 |
| 5,512,871 A | 4/1996 | Oudet et al. | |
| 5,699,031 A | 12/1997 | Covelli et al. | |
| 5,786,649 A | 7/1998 | Roberts | |
| 5,811,898 A | 9/1998 | Everingham | |
| 6,020,804 A * | 2/2000 | Gandel ........................ 335/272 |
| 6,313,553 B1 | 11/2001 | Gandel et al. | |
| 6,691,845 B2 * | 2/2004 | Showalter .................... 192/35 |
| 6,802,794 B2 * | 10/2004 | Showalter ................. 192/84.7 |
| 2003/0006729 A1 | 1/2003 | Raymond | |

* cited by examiner

Primary Examiner—Rodney H. Bonck
(74) Attorney, Agent, or Firm—Brinks Hofer Gilson & Lione; Greg Dziegielewski (57) ABSTRACT

A clutch having a multiple pole electromagnetic actuator is useful in motor vehicle powertrain components such as transaxles, transfer cases, transmissions, differentials and the like. The electromagnetic actuator includes a stationary coil, a rotating, multiple pole stator and a rotating, multiple pole armature which is linked to the stator. Both the stator and the armature include multiple coils which are electrically connected in pairs. A cam or ball ramp assembly is disposed between the armature and a friction clutch pack. Energization of the stationary coil induces current in the coils of the stator and the respective coils of the armature. The magnetic flux and force generated rotates the armature relative to the stator, thereby actuating the cam or ball ramp assembly, which in turn, compresses the friction clutch pack.

20 Claims, 6 Drawing Sheets

CLUTCH HAVING A MULTIPLE POLE ELECTROMAGNETIC ACTUATOR FOR TRANSFER CASES AND THE LIKE

BACKGROUND OF THE INVENTION

The invention relates generally to an electromagnetically actuated clutch and more particularly to a clutch having a multiple pole electromagnetic actuator.

The majority of four-wheel drive motor vehicles and virtually every sport utility vehicle or pick-up truck equipped with four-wheel drive utilizes a transfer case driven by the output of the transmission to distribute drive torque to the front and rear drive lines of the vehicle. These transfer cases incorporate many diverse mechanical devices which may provide, among other features, a reduced speed (low gear) drive mode, interaxle speed differentiation and manual or automatic engagement of an interaxle clutch to intermittently reduce prop shaft speed differences or positively drive front and rear prop shafts.

Significant developments have been made with regard to systems which sense wheel speed differences and engage interaxle clutches to reduce such speed differences. An automatically engaging system is disclosed, for example, in co-owned U.S. Pat. No. 5,407,024.

In addition to developments directed to enhancing the flexibility and operation of such transfer cases are developments directed to providing smooth, seamless operation of the components of the transfer case such as the interaxle clutch as well as increasing torque capacity of such a clutch. The present invention is directed to such a feature.

SUMMARY OF THE INVENTION

A clutch having a multiple pole electromagnetic actuator is useful in motor vehicle powertrain components such as transaxles, transfer cases, transmissions, differentials and the like. The electromagnetic actuator includes a stationary coil, a rotating, multiple pole stator and a rotating, multiple pole armature which is linked to the stator. Both the stator and the armature include multiple coils which are electrically connected in pairs. A cam or ball ramp assembly is disposed between the armature and a friction clutch pack. Energization of the stationary coil induces current in the coils of the stator and the respective coils of the armature. The magnetic flux and force generated rotates the armature relative to the stator, thereby actuating the cam or ball ramp assembly, which in turn, compresses the friction clutch pack.

Thus it is an object of the present invention to provide an electromagnet clutch actuator having a stationary coil, a stator, an armature and a cam or ball ramp assembly.

It is a further object of the present invention to provide a transfer case having an electromagnetically actuated clutch.

It is a still further object of the present invention to provide an electromagnetic clutch actuator having a stationary coil, a multiple pole stator and a multiple pole armature each having multiple electrically connected coils.

It is a still further object of the present invention to provide an electromagnetically actuated clutch having an electromagnetic coil, a stator with a plurality of poles and coils coupled to an armature with a like plurality of poles and coils, a cam or ball ramp assembly and a friction clutch pack.

Further objects and advantages of the present invention will become apparent by reference to the following description of the preferred embodiment and appended drawings wherein like reference numbers refer to the same component, element or feature.

DETAILED DESCRIPTION OF THE PREFERRED EMBODIMENT

Figure 1:
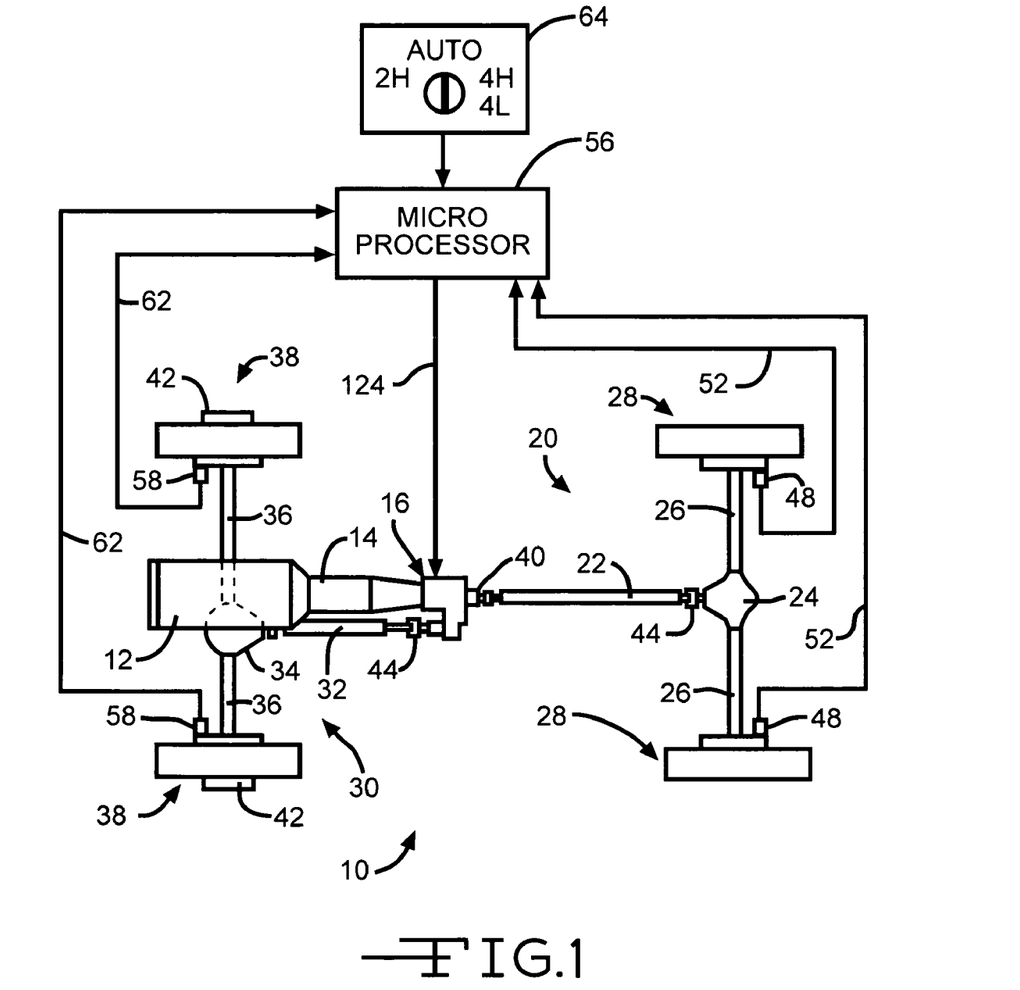
FIG. 1 is a diagrammatic view of a motor vehicle power train having a transfer case incorporating the present invention

Referring now to FIG. 1, a four-wheel vehicle drive train which may utilize the present invention is diagrammatically illustrated and designated by the reference number 10. The four-wheel vehicle drive train 10 includes a prime mover 12 such as an internal combustion or diesel engine having an output which is coupled to and directly drives a transmission 14. The output of the transmission 14 directly drives a transfer case assembly 16 which provides motive power to a primary or rear drive driveline 20 comprising a primary or rear prop shaft 22, a primary or rear differential 24, a pair of live primary or rear axles 26 and a respective pair of primary or rear tire and wheel assemblies 28.

The transfer case assembly 16 also selectively provides motive power to a secondary or front driveline 30 comprising a secondary or front prop shaft 32, a secondary or front differential 34, a pair of live secondary or front axles 36 and a respective pair of secondary or front tire and wheel assemblies 38. The front tire and wheel assemblies 38 may be directly coupled to a respective front axles 36 or, if desired, a pair of manually or remotely activatable locking hubs 42 may be operably disposed between the front axles 36 and a respective one of the tire and wheel assemblies 38 to selectively connect same. Finally, both the primary driveline 20 and the secondary driveline 30 may include suitable and appropriately disposed universal joints 44 which function in conventional fashion to allow static and dynamic offsets and misalignments between the various shafts and components.

Disposed in sensing relationship with each of the rear tire and wheel assemblies 28 is a wheel speed sensor 48. Preferably, the wheel speed sensors 48 may be the same sensors utilized with, for example, an antilock brake system (ABS) or other vehicle control or traction enhancing system. Alternatively, a single sensor, disposed to sense rotation of the primary or rear prop shaft 22 may be utilized. Signals from the sensors 48 are provided in lines 52 to a microprocessor 56. Similarly, disposed in sensing relationship with the front tire and wheel assemblies 38 are respective wheel speed sensors 58 which provide signals to the microprocessor 56 in lines 62. Once again, the sensors 58 may be a part of or shared with an antilock brake system or other traction enhancing system.

Typically, an operator selectable switch 64 may be utilized and is generally disposed within reach of the vehicle operator in the passenger compartment (not illustrated). The switch 64 may be adjusted to select various operating modes such as two-wheel high gear, automatic, i.e., on-demand or adaptive operation, four-wheel high gear or four-wheel low gear depending upon the particular vehicle and configuration of the transfer case assembly 16. One such system which provides torque delivery to the secondary driveline 30 in increments or decrements in response to a sensed wheel speed difference between the primary driveline 20 and the secondary driveline 30 is disclosed in U.S. Pat. No. 5,407,024.

Figure 2:
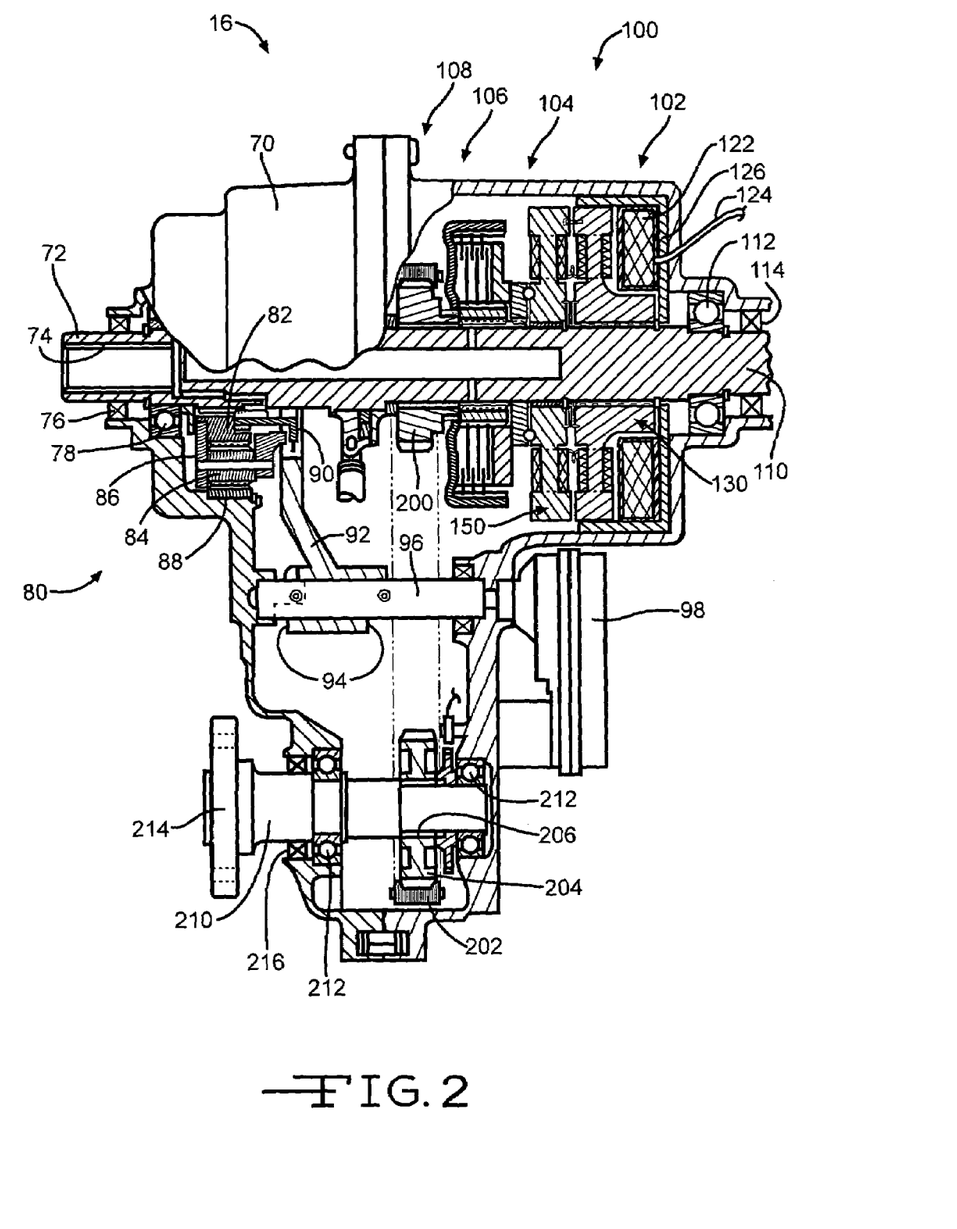
FIG. 2 is a side, elevational view in partial section of a motor vehicle transfer case incorporating the present invention.

Referring now to FIGS. 1 and 2, the transfer case assembly 16 includes a multiple piece, cast metal housing 70 having multiple and diverse openings, apertures, counterbores, grooves, ledges, slots, planar surfaces and other features for receiving gaskets, seals and various fixed and rotating components of the transfer case assembly 16 as will be readily appreciated. Among those components is an input shaft 72 having a plurality of female splines or internal gear teeth 74 which receives a complementarily splined output shaft (not illustrated) of the transmission 14 illustrated in FIG. 1. An oil seal 76 provides a fluid-tight seal between the input shaft 72 and the housing 70. The input shaft 72 is rotatably supported upon an anti-friction bearing such as a ball bearing assembly 78.

The transfer case assembly 16 typically also includes a speed reducing planetary gear assembly 80. The speed reducing planetary gear assembly 80 is conventional and includes a sun gear 82 which constantly engages and drives a plurality of planet gears 84 (one of which is illustrated in FIG. 2) rotatably mounted within a rotating planet gear carrier 86 and in constant engagement with a stationary ring gear 88. A dog clutch or shift collar 90 may be translated axially by a shift fork 92 to provide direct, high speed drive when engaging the input shaft 72 and a reduced speed, low range drive when engaging the planet gear carrier 86. The shift fork 92 is axially, bi-directionally translated through the interaction of helical cams 94 and followers associated with a rotating shift rail 96 which is driven by a bi-directional electric motor drive assembly 98 controlled by the operator selectable switch 64.

The transfer case assembly 16 also includes an electromagnetic clutch assembly 100 having an electromagnetic actuator assembly 102 which cooperates with a ball ramp operator assembly 104 to compress a friction clutch pack assembly 106 which delivers drive torque to a chain drive assembly 108.

The transfer case assembly 16 also includes a primary output shaft 110 preferably and typically aligned coaxially with the input shaft 72. An anti-friction bearing such as a ball bearing assembly 112 rotatably supports the end of the primary output shaft 110 opposite the input shaft 72 and an oil seal 114 provides a fluid tight seal between the primary output shaft 110 and the housing 70.

Figure 3:
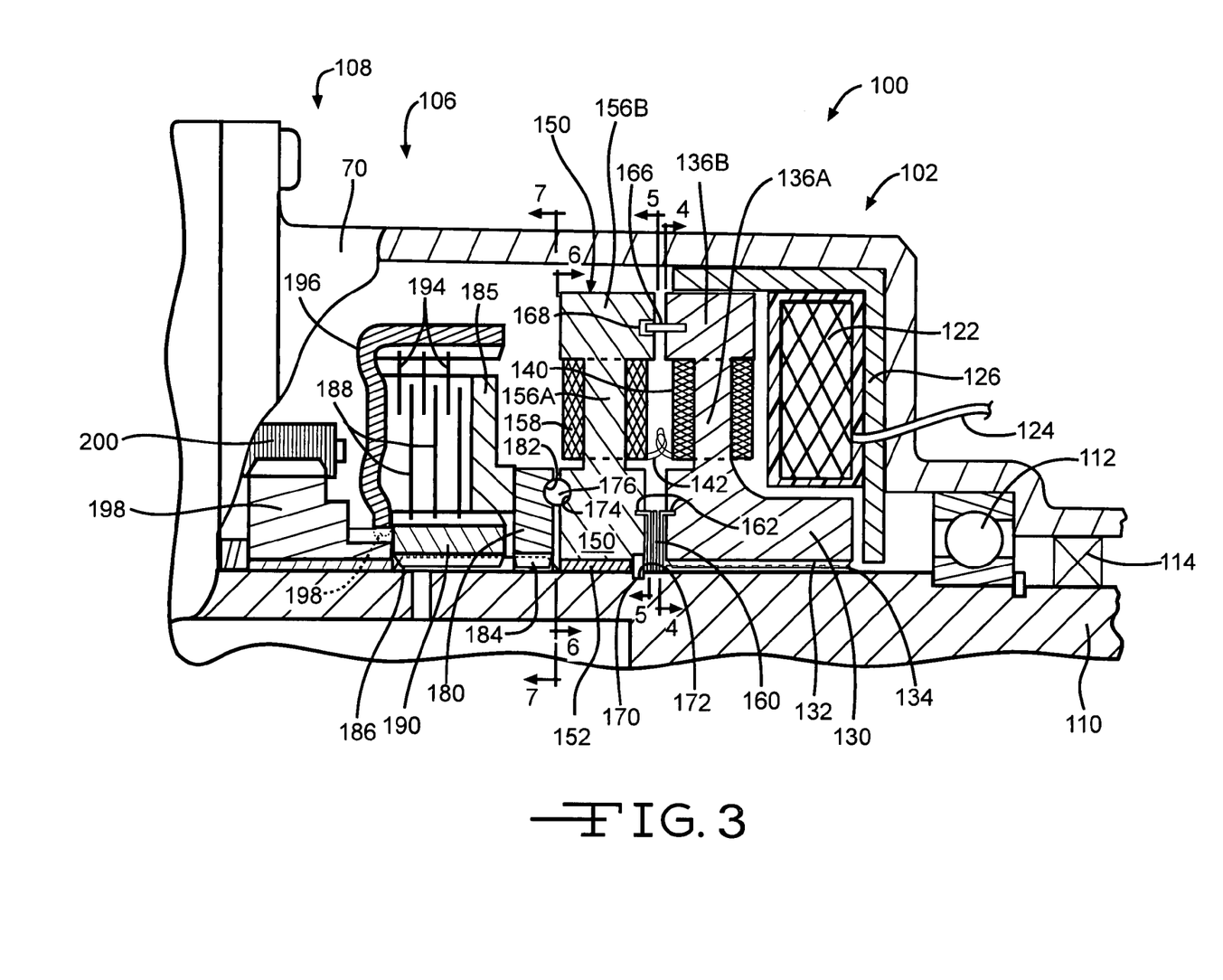
FIG. 3 is an enlarged, fragmentary view in partial section of an electromagnetic clutch according to the present invention.
Figure 4:
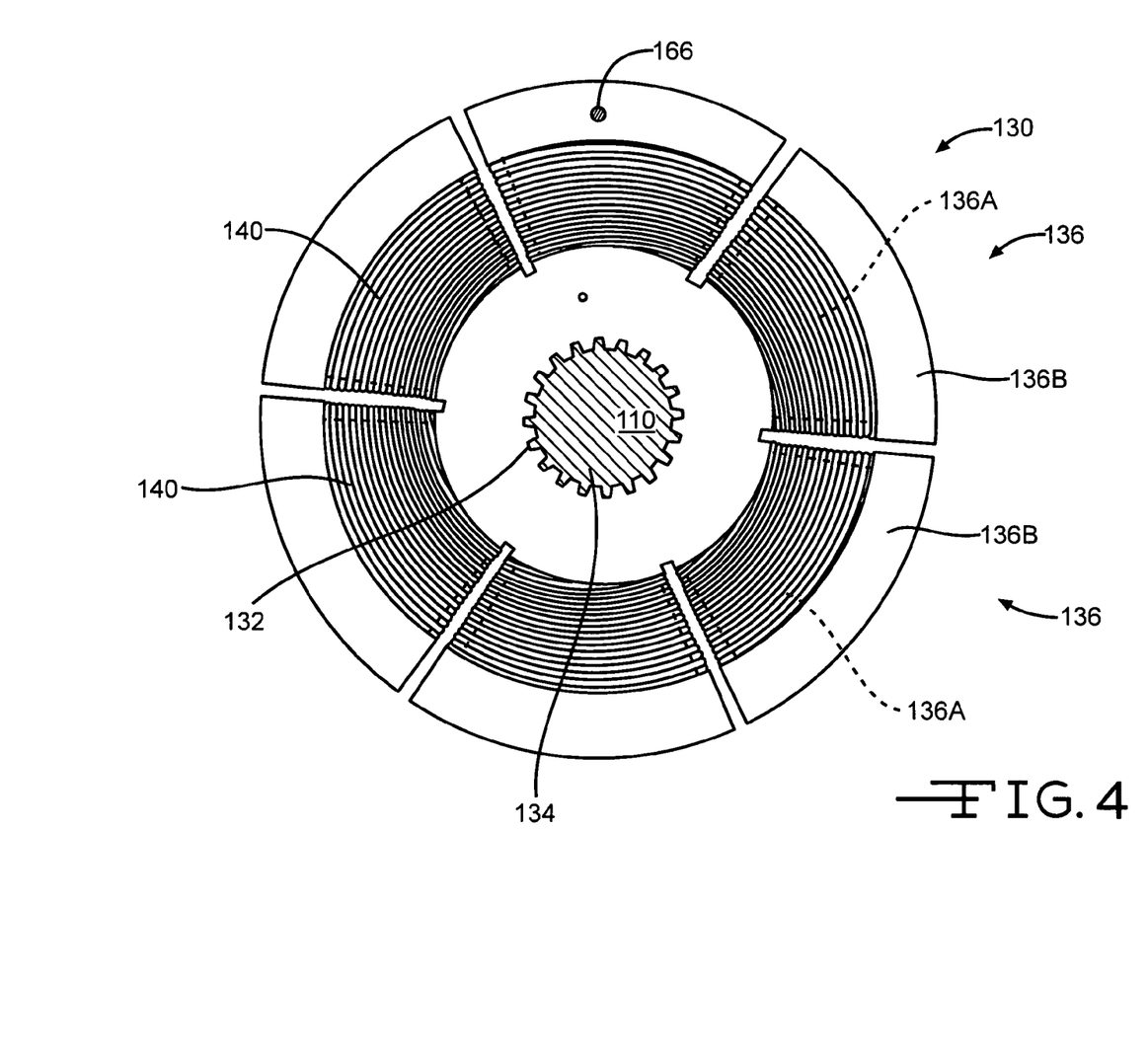
FIG. 4 is a full, sectional view of a stator of an electromagnetic transfer case clutch according to the present invention taken along line 4—4 of FIG. 3.

Referring now to FIGS. 2, 3, and 4, the electromagnetic actuator assembly 102 includes an annular electromagnetic coil 122 which is disposed coaxially about the output shaft 110 and which receives electrical energy through a single or multiple conductor cable 124. Partially surrounding and extending along orthogonal axes from the electromagnetic coil 122 is a metal, flux concentrating shell 126. The flux concentrating shell 126 extends both axially beyond and radially inwardly beyond the electromagnetic coil 122 to provide a flux path and intensify the magnetic flux generated by the electromagnetic coil 122. Disposed generally adjacent the electromagnetic coil 122 as well as the flux concentrating shell 126 is a multiple pole stator 130. The multiple pole stator 130 includes a plurality of internal or female splines or gear teeth 132 which are complementary to and engage male or external splines or gear teeth 134 on the primary output shaft 110.

As illustrated in FIGS. 3 and 4, the multiple pole stator 130 defines a plurality of magnetic poles or pole pieces 136 having a reduced diameter spoke region 136A and an enlarged circumferential terminal region 136B. Preferably the stator 130 defines six poles or pole pieces, although more or fewer may be utilized if desired, it being appreciated that more poles or pole pieces 136 may increase the available relative rotation between the stator 130 and an armature 150 but will typically reduce the initial available force when the poles are at their maximum separation. Contrariwise, fewer poles or pole pieces 136 will reduce the available relative rotation between the pole pieces but will typically provide increased magnetic attraction and force generation. Disposed about each of the spoke regions 136A is an electromagnetic coil 140. Each of the electromagnetic coils 140 terminates in a pair of flexible electrical conductors 142.

Figure 5:
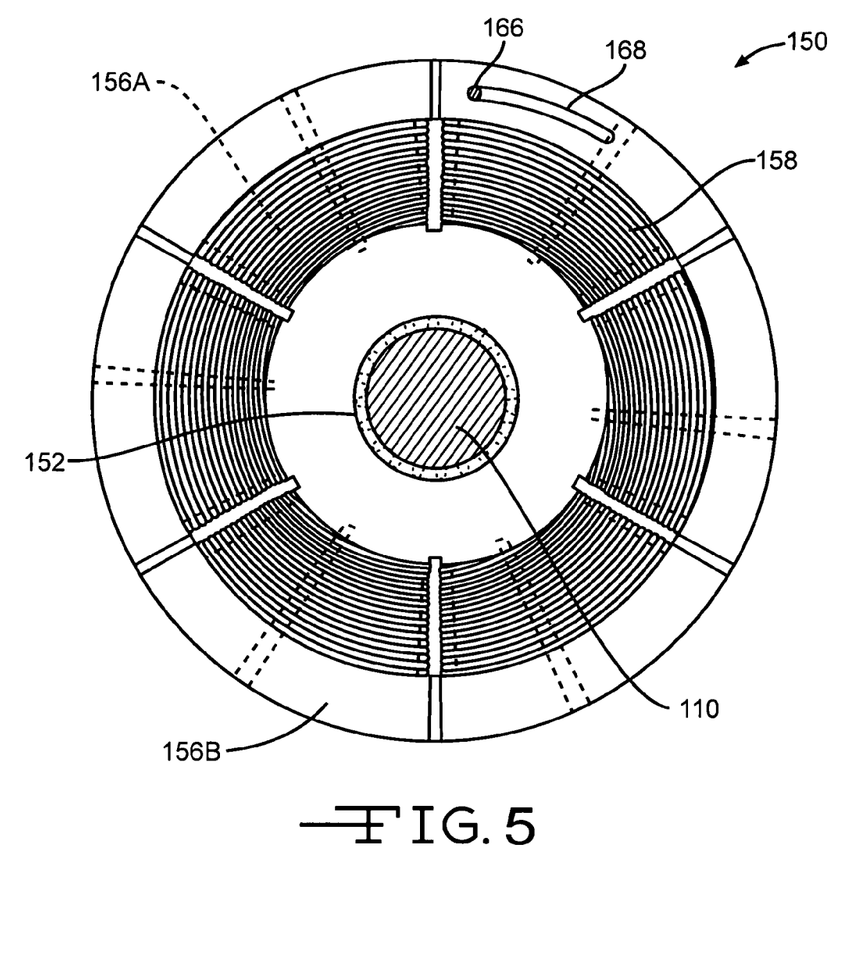
FIG. 5 is a full, sectional view of an armature of an electromagnetic transfer case clutch according to the present invention taken along line 5—5 of FIG. 3.

As illustrated in FIGS. 3 and 5, disposed adjacent the multiple pole stator 130 is a multiple pole armature 150. The multiple pole armature 150 is freely rotatably disposed about the primary output shaft 110 on a journal bearing 152 or an antifriction bearing such as a needle bearing assembly (not illustrated). The multiple pole armature 150 defines the same number of poles or pole pieces 156 as the stator 130 and each pole or pole piece 156 defines a reduced diameter spoke 156A and enlarged circumferential terminal region 156B. The multiple pole armature 150 likewise includes an electromagnetic coil 158 disposed about each of the spokes 156A which are separately and respectively electrically connected through the electrical conductors 142 to the like plurality of electromagnetic coils 140 on the stator 130. The electromagnetic coils 140 and 158 are wired together so that when electricity is induced into the electromagnetic coils 140, and then through the wires 142 to the electromagnetic coils 158, adjacent poles or pole pieces 136 and 156 attract and cause relative rotation between the stator 130 and the armature 150.

A circular multi-turn spring 160 having axially extending lugs or tabs 162 which seat within suitably located axially extending blind apertures 164 in the stator 130 and the armature 150 provides a biasing and restoring force to drive the armature 150 into a relaxed or quiescent first position relative to the stator 130. The first position is defined by an axial register pin 166 which is seated within and secured to the stator 130 and is received within an elongate arcuate slot 168 formed in the armature 150. The circular spring 160, the register pin 166 and the arcuate slot 168 cooperate to, first of all, rotate the armature 150 relative to stator 130 to the first relaxed or quiescent position during inactive periods, i.e., when the electromagnetic coil 122 is deenergized and limit the rotation of the armature 150 relative to the stator 130 to the angular rotation defined by the arcuate slot 168 when the electromagnetic coil 122 is energized. A snap ring 170 seated within a complementary circumferential slot or groove 172 in the primary output shaft 110 acts as a stop or restraining member to limit axial motion of the armature 150 to the right, as will readily be appreciated.

Figure 6:
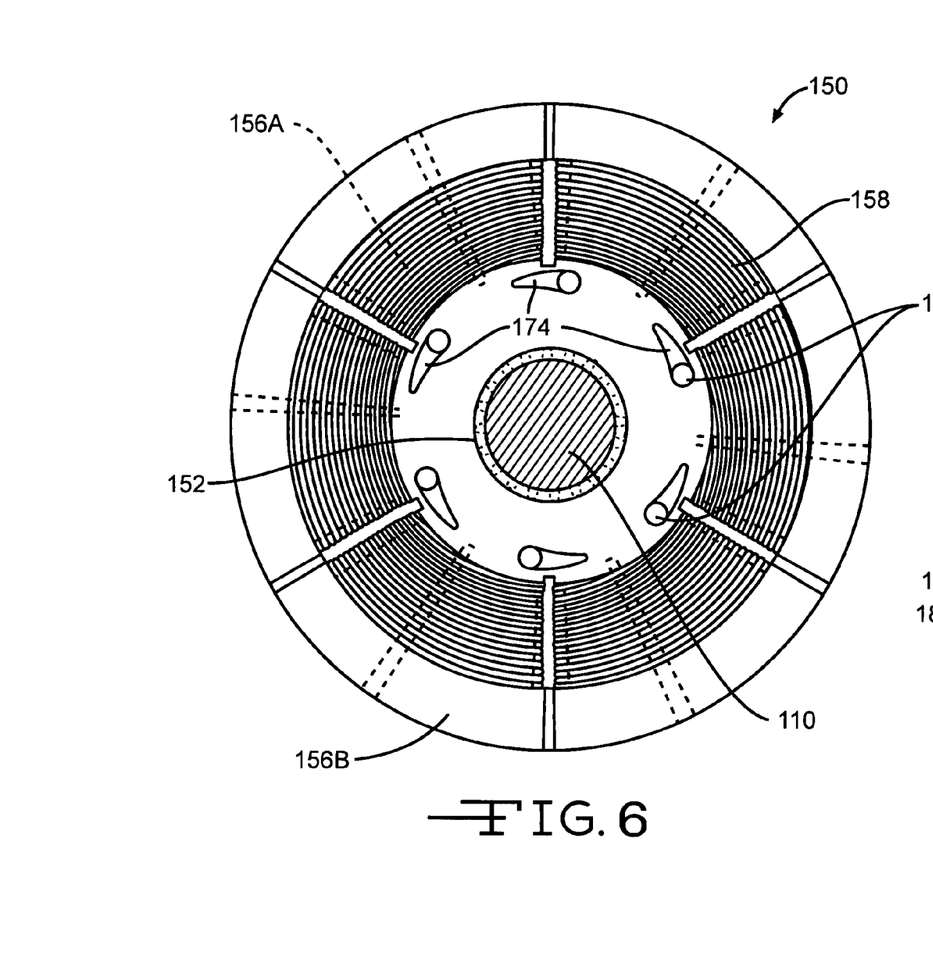
FIG. 6 is a full, sectional view of an armature of an electromagnetic transfer case clutch according to the present invention taken along line 6—6 of FIG. 3.
Figure 7:
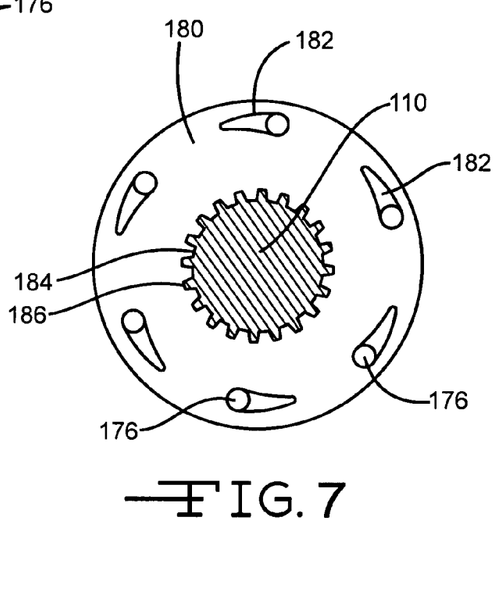
FIG. 7 is a full sectional view of an armature of an electromagnetic clutch according to the present invention taken along line 7—7 of FIG. 3.

Turning then to FIGS. 3, 6 and 7, the ball ramp assembly 104 includes a plurality of curved arcuate recesses 174 formed on the face of the armature 150 opposite the stator 130. Preferably, there are at least three arcuate recesses 174. More recesses 174 may be utilized as illustrated in FIG. 6. However, tests and experience have both shown that notwithstanding the number of recesses 174, only three will typically participate in the mechanical operation of the assembly 104 at any one time. Within each of the arcuate recesses 174 is disposed a load transferring ball 176. Immediately adjacent the armature 150 is a circular member 180 also including a plurality of arcuate recesses 182 which also receive the load transferring balls 176 and extend in the opposite circumferential direction. The load transferring balls 176 are thus trapped within the arcuate recess 174 and 182 and between the armature 150 and the circular member 180.

Since the armature 180 rotates in only direction when it is activated, the recesses 174 and 182 extend only in one circumferential direction from a center and define a curved, tear drop shape.

It will be appreciated that the recesses 174 and 182 and the load transferring balls 176 may be replaced with other analogous mechanical elements which cause axial displacement of the circular member 180 in response to relative rotation between it and the armature 150. For example, tapered rollers disposed in complementarily configured conical helices or opposed cam members having opposed, oblique surfaces may be utilized.

An important design consideration of the recesses 174 and 182 and the load transferring balls 176 is that the geometry of their design and the overall clearances in the clutch assembly 106 ensure that they are non self-engaging. The friction clutch pack assembly 106 must not self-engage but rather must be capable of modulating clamping of the clutch plates within the friction clutch pack assembly 106 and torque transfer in direct, proportional response to the electrical input to the electromagnetic coil 122. Additional details of this mechanism may be found in U.S. Pat. No. 5,492,194 which is hereby incorporated by reference.

The circular member 180 includes female or interior splines or gear teeth 184 which mate with complementarily configured male splines or gear teeth 186 formed on the primary output shaft 110. Upon relative rotation of the armature 150 and the circular member 180, the load transferring balls 176 ride up the walls of the arcuate recesses 174 and 182 and drive the circular member 180 and the armature 150 apart. Since rightward axial motion of the armature 150, as viewed in FIG. 3, is restrained by the snap ring 170, the circular member 180 will move to the left upon relative rotation of the armature 150 and the circular member 180. An annular apply plate 185 resides between the circular member 180 and the friction clutch pack assembly 106 and transmits axial motion and force therebetween.

Returning then to FIGS. 2 and 3, the friction clutch pack assembly 106 includes a first plurality of clutch plates or disks 188 splined to the primary output shaft 110 through a splined hub 190 and a second plurality of interleaved clutch plates or disks 194 splined to a bell-shaped housing 196 which is drivingly coupled through interengaging splines, gear teeth or lugs 198 to a first chain drive sprocket 200 of the chain drive assembly 108. The first chain drive sprocket 200 engages a drive chain 202 which extends about and drives a driven second chain sprocket 204 which is coupled by interengaging splines 206 or other positive connecting means to a secondary output shaft 210. The secondary output shaft 210 is rotatably supported by a pair of anti-friction bearings such as ball bearing assemblies 212 and may include a flange 214 which may be a portion of one of the universal joints 44 illustrated in FIG. 1. An oil seal 216 provides a suitable fluid tight seal between the secondary output shaft 210 and the transfer case housing 70.

In operation, the electromagnetic clutch assembly 100, which will now be described with reference to FIGS. 2 and 3, provides improved operating smoothness and torque throughput capacity. When the microprocessor 56 provides an electrical signal to the electromagnetic coil 122 through the single or multiple conductor cable 124, magnetic flux is generated and concentrated by the flux concentrating shell 126 and is directed into the stator 130 which will generally be rotating as is the primary output shaft 110. Magnetic flux passing through the stator 130 will induce electrical current into the electromagnetic coils 140 disposed about each of the spoke regions 136A. As noted, the electromagnetic coils 140 on the pole pieces 136A are wired through the flexible electrical conductors 142 to the electromagnetic coils 158 disposed about the pole pieces 156A such that attraction between the pole pieces 136 and 156 results. Such attraction causes relative rotation of the armature 150 relative to the stator 130. Such relative rotation displaces the load transferring balls 176 disposed within the arcuate recesses 174 and 182, generating force and driving the circular member 180 to the left as illustrated in FIGS. 2 and 3. Such leftward translation correspondingly translates the apply plate 185 which compresses the friction clutch pack assembly 106 comprising the first plurality of clutch disks 188 and the second plurality of interleaved clutch disks 194. Such compression then transfers torque from the primary output shaft 110 through the chain drive assembly 108 to the secondary output shaft 210.

The foregoing disclosure is the best mode devised by the inventors for practicing this invention. It is apparent, however, that devices incorporating modifications and variations will be obvious to one skilled in the art of clutches for transfer cases transmissions, transaxles and similar devices. Inasmuch as the foregoing disclosure is intended to enable one skilled in the pertinent art to practice the instant invention, it should not be construed to be limited thereby but should be construed to include such aforementioned obvious variations and be limited only by the scope and spirit of the following claims.

I claim:

1. An electromagnetically actuated clutch assembly comprising, in combination,
    a stationary electromagnetic coil,
    a stator disposed adjacent said electromagnetic coil and defining a plurality of pole pieces, said pole pieces including first coils,
    an armature disposed adjacent said stator and defining a like plurality of pole pieces, said pole pieces including second coils electrically coupled to a respective, adjacent one of said first coils,
    means for generating axial motion upon relative rotation between said armature and said stator, and
    a friction clutch pack adjacent said just recited means for transferring torque when said armature rotates relative to said stator and said means compresses said friction clutch pack.

2. The electromagnetically actuated clutch assembly of claim 1 wherein said stator and said armature both include six pole pieces.

3. The electromagnetically actuated clutch assembly of claim 1 further including a biasing spring disposed between said stator and said armature.

4. The electromagnetically actuated clutch assembly of claim 1 further including means for limiting relative rotation between said stator and said armature.

5. The electromagnetically actuated clutch assembly of claim 1 further including a flux focusing annulus extending radially and axially beyond said stationary electromagnetic coil.

6. The electromagnetically actuated clutch assembly of claim 1 wherein said means includes a first set of cams formed on said armature and a circular member including a second set of cams adjacent and opposing said first set of cams.

7. The electromagnetically actuated clutch assembly of claim 1 wherein said means includes a plurality of opposed arcuate recesses and load transferring members disposed in said arcuate recesses.

8. An electromagnetically actuated clutch assembly comprising, in combination,
   an electromagnetic coil,
   a stator disposed adjacent said electromagnetic coil and defining a plurality of pole pieces, said pole pieces including stator coils,
   an armature disposed adjacent said stator and defining a like plurality of pole pieces, said pole pieces including armature coils electrically connected to a respective, adjacent one of said stator coils,
   cam means associated with said armature for generating axial force upon relative rotation between said armature and said stator, and
   a friction clutch pack adjacent said cam recited means for selectively transferring torque.

9. The electromagnetically actuated clutch assembly of claim 8 wherein said stator is disposed coaxially about and rotates with a shaft.

10. The electromagnetically actuated clutch assembly of claim 9 wherein said armature is free to rotate on said shaft.

11. The electromagnetically actuated clutch assembly of claim 9 wherein said cam means associated with said armature includes a plurality of opposed arcuate recesses and load transferring members disposed in said arcuate recesses.

12. The electromagnetically actuated clutch assembly of claim 8 further including a biasing spring disposed between said stator and said armature.

13. The electromagnetically actuated clutch assembly of claim 8 further including means for limiting relative rotation between said stator and said armature.

14. The electromagnetically actuated clutch assembly of claim 8 wherein said stator and said armature both include six pole pieces.

15. An electromagnetically actuated clutch for use in transfer cases, transmissions, differentials and transaxles comprising, in combination,
   a stationary electromagnetic coil,
   a stator disposed adjacent said electromagnetic coil and defining a plurality of pole pieces, said pole pieces including first coils,
   an armature disposed adjacent said stator and defining a like plurality of pole pieces, said pole pieces including second coils electrically coupled to a respective, adjacent one of said first coils,
   a cam assembly having opposed oblique surfaces for generating axial displacement upon relative rotation of said surfaces and,
   a friction clutch pack having an input and an output, said friction clutch pack acted upon by said cam assembly.

16. The electromagnetically actuated clutch assembly of claim 15 further including a flux focusing annulus extending radially and axially beyond said stationary electromagnetic coil.

17. The electromagnetically actuated clutch assembly of claim 15 wherein said stator and said armature both include six pole pieces.

18. The electromagnetically actuated clutch assembly of claim 15 further including a biasing spring disposed between said stator and said armature.

19. The electromagnetically actuated clutch assembly of claim 15 further including means for limiting relative rotation between said stator and said armature.

20. The electromagnetically actuated clutch assembly of claim 15 wherein said cam means associated with said armature includes a plurality of opposed arcuate recesses and load transferring members disposed in said arcuate recesses.

* * * * *